3,376,368
METHOD OF BONDING SHOE UPPERS TO RUBBER SOLES
Charles Giannone, Brooklyn, N.Y., and Dale Marsh, Maumee, Ohio, assignors to Interchemical Corporation, New York, N.Y., a corporation of Ohio
No Drawing. Filed Mar. 5, 1965, Ser. No. 437,596
1 Claim. (Cl. 264—135)

ABSTRACT OF THE DISCLOSURE

A process for coating a shoe upper with a calendered curable composition of sulfur-curable rubber and topcoating this with a vinyl copolymer coating composition and bonding the upper to butadiene-acrylonitrile rubber soles by means of the curing step for the soles, in the absence of migratory plasticizers.

---

This invention relates to a method of bonding rubber soles to vinyl-coated shoe uppers. More particularly it relates to a method of making a shoe having the upper topcoated with an essentially thermoplastic coating, the bond between the rubber sole and the upper being formed by a curing operation rather than by application of an adhesive.

Attempts to use such a joining operation when the uppers bear a thermoplastic coating, such as plasticized polyvinyl chloride, have always previously met with failure because of the excessive flow of the thermoplastic coating at the juncture between sole and upper. Also any embossing on the thermoplastic coating was marred by the flow. The only coated fabrics that the art has been able to bond by such a method are those coated with thermosetting materials. One method of making shoes involves bonding cloth or leather upper material to a rubber sole by a curing operation alone. The sole is molded and vulcanized in contact with the upper, all in one operation. Such a process eliminates the many steps, particularly the excessive hand work needed for making shoes by conventional methods. Nevertheless, uppers coated with thermoplastic material can not be bonded by any of these known methods without the use of adhesives at the juncture of the sole and the upper.

It has been found that by coating the uppers with a calendered curable composition of sulfur-curable rubber and topcoating this with a vinyl copolymer coating composition the upper can be bonded to butadiene-acrylonitrile rubber soles by the curing operation for the soles, provided migratory plasticizers are absent. The plasticizers used in this invention are therefore of the non-migratory type, such as "Paraplex G50," "Paraplex G25," "Paraplex G40," "Santicizer 409," "Admex 770," and the like.

By the process of this invention bonding of sole to vinyl-coated upper is obtained having a tensile strength of the order of 30 lbs. per inch of width of upper. When an attempt is made to use commercial sole stocks instead of the sole stock of this invention, no bond whatever is formed between the uppers described above and such sole stocks.

The topcoat on the uppers of this invention is comprised for example of a blend of "VYNS" vinyl copolymer and "Hycar" butadiene-acrylonitrile rubber plasticized with non-migratory plasticizers. The sole contains butadiene-acrylonitrile rubber, non-migratory plasticizers, and conventional ingredients used in rubber compounding. Migratory plasticizers are excluded from the shoe uppers and sole.

EXAMPLE

A *sole rubber* was compounded in the conventional way using the following ingredients

| | Grams |
|---|---|
| Chemigum N6B | 200.0 |
| A mixture of 100.0 g. "Hi Sil 233," 10.0 g. "Regal SRF Black," and 60.0 g. "Paraplex G50" | 170.0 |
| A mixture of 10.0 g. "Zinc Oxide XX4," 2.0 g. "Emersol 132," and 4.0 g. polyethylene glycol (molecular weight of 6000) | 16.0 |
| "Wingstay T" | 1.0 |
| A mixture of 3.0 g. flowers of sulfur, 1.2 g. "Unads," and 2.5 g. "Altax" | 6.7 |
| | 393.7 |

The above ingredients were added in the order named, to a cold 2-roll mill, and thoroughly mixed. About 20 to 30 minutes of mixing is usually the time required.

A thermoplastic *topcoating composition* was made by adding the following ingredients to twice their weight of methyl ethyl ketone.

| | Grams |
|---|---|
| "VYNS" | 100 |
| "Hycar 1053" | 40 |
| "Paraplex G25" | 25 |
| "Paraplex G40" | 25 |
| $TiO_2$ "R510" | 100 |
| Cadmium red "Selenide Red 1420" | 10 |
| "Mark M"+"Mark PL"(2:1) | 3 |
| "Thermolite 31" | 0.5 |
| | 303.5 |

The sulfur-curable rubber *calender coating* composition was compounded in the conventional way from the following ingredients, added in the order given.

| | Grams |
|---|---|
| "Shell S-1500 XFP" | 200.0 |
| A mixture of 150.0 g. talc "Mistron Vapor," 5.0 g. cadmium red, "Selenide Red 1420" 0 and 50.0 g. titanium oxide "R510" | 205.0 |
| A mixture of 2.0 g. "Antioxidant 425," 1.0 g. paraffin wax and 10.0 g. zinc oxide "XX4" | 13.0 |
| A mixture of 3.8 g. flowers of sulfur 3.8 g. "Altax," and 0.4 g. of "Butyl Zimate" | 8.0 |
| "Trimene base" | 1.0 |
| | 427.0 |

An *adhesive* was prepared by making a dispersion of 35% by weight of some of the above calender coating in toluene.

*Cloth for the uppers* was prepared by applying two coats of the above adhesive on bleached 1.02 cotton sateen. The sulfur-curable rubber coating composition was calendered on the adhesive coating; when cured it was 5 mils thick. A laminate was then formed by applying another layer of the same cloth, likewise coated with two applications of the same adhesive, the adhesive side being applied to the calendered coating. One side of the two-ply laminate thus obtained was given a double coating of the same adhesive and a coating of the calender coating was calendered thereon. When cured, this coating was 10–20 mils thick. The thermoplastic topcoating defined above was applied on top of this; a cured thickness of less than 1 mil is preferred, although thicknesses of up to 3 mils are quite operable. The whole fabric was then cured 1 hour at 280° F. The curing cycle is not critical, but from practical considerations curing temperatures in the range of about 265°–310° F. are preferred. The time of curing varies with the temperature, a phenomenon well known in the art. The sole rubber was compounded according to the formulation described above. A suitable upper pattern was then cut out of the laminated cloth prepared as described and the upper was wrapped around a hot last at 300° F. A biscuit of the sole rubber composition was placed in the mold and brought into contact with the lasted upper, all being at a temperature of 300° F. The sole rubber flowed, filled the mold, and was vulcanized. The upper with its embossing unmarred was thus firmly anchored to the sole. The adhesion obtained amounted to 30 lbs. or better per linear inch cross section of the fabric, as measured on the Scott tester by conventional methods.

In preparing the uppers other adhesives may be used that are recommended for adhesion of rubber to cloth, for instance a tire cord cement consisting of a vinyl pyridine/resorcinol formaldehyde latex or a cement consisting of polymethylene polyphenylisocyanate as a 5% solution in a 50/50 mixture of toluene and methyl ethyl ketone.

The vinyl used is preferably of the "hard" vinyl type, that is, a copolymer of from about 85% to about 91% of vinyl chloride and, correspondingly, from about 15% to about 9% vinyl acetate. Percentages given are on the weight basis; this also applies to the claims.

An example of compositions for making black uppers follows.

(A) A black curable rubber *calender coating* was compounded by adding to a cold 2-roll mill the following ingredients in the order named.

| | Grams |
|---|---|
| "Hycar 1042" | 120.0 |
| "Shell S-1500 XFP" | 30.0 |
| "Regal SRF Black" | 120.0 |
| Mixture "X" | 15.0 |
| Mixture of 3.0 g. "Antioxidant 2246," 7.5 g. zinc oxide XX4, and 0.75 g. "Emerson 132" | 11.25 |
| Mixture of 0.3 g. sulfur and 4.5 g. "Methyl Tuads" | 4.8 |
| | 301.05 |

Mixture "X" was a blend of:

| | Grams |
|---|---|
| "Monoplex S-73" | 6.8 |
| "Adipol XX" | 6.8 |
| "Santicizer 409" | 9.6 |
| "Santicizer 141" | 8.2 |
| "Santicizer 160" | 7.4 |
| "Plastolein 9720" | 8.2 |
| | 47.0 |

(B) The black thermoplastic *topcoating* composition was a 25% blend in methylethyl ketone of the following materials, which were compounded at 250° F. on a 2-roll mill.

| | Grams |
|---|---|
| "VYNS" | 100 |
| "Hycar 1053" | 40 |
| "Paraplex G25" | 25 |
| "Paraplex G40" | 25 |
| "Thermolite 31" | 1.5 |
| "Superba Black" | 38.0 |
| | 229.5 |

As before one side of a laminate of 1.02 bleached sateen, bonded with a cured rubber compound, was coated with an adhesive anchor, such as a 5% solution of a polymethylene polyphenyl isocyanate in a 50/50 mixture of toluene and methylethyl ketone. Calender coating "A," above described, was calendered on the adhesive-coated side of the sateen laminate. The calendering operation was conducted at a speed of about 3 feet per minute. The calender rolls were internally heated to the following temperatures; side roll, 165° F.; top roll, 170° F.; middle roll, 180° F.; bottom roll, 300° F. Thickness of the calendered "A" coating was 12 mils. This coating, uncured, was then topcoated with thermoplastic topcoating "B," described above, and air dried at room temperature for 1 hour. The coatings were then cured at 310° F. for 130 minutes. This material had exceptionally good resistance to "cutthrough" from the mold, i.e., unwanted groovings were minimized.

An example of compositions for making white uppers follows. The procedure was similar to that used in making black rubbers, but the white curable rubber *calender coating* was made by adding the ingredients listed below in the order named to the 2-roll mill.

| | Grams |
|---|---|
| "Hycar 1042-X69" | 160 |
| "Shell S-1502S" | 40 |
| A mixture of 160 g. of "Hi-Sil-233" and 13.3 g. of "rutile titanium dioxide" R510 | 173.3 |
| Mixture "X" | 20 |
| A mixture of 10 g. "zinc oxide XX4," 1.0 g. "Emersol 132," and 4.0 g. "Antioxidant 2246" | 15 |
| A mixture of 4.0 g. "Altax," 0.3 g. "methyl zimate," 2.0 g. "Rotax," and 2.0 g. of flowers of sulfur | 8.3 |
| | 416.6 |

The white thermoplastic *topcoating* composition consisted of a blend of the ingredients listed below with twice their weight of methylethyl ketone.

| | Grams |
|---|---|
| "VYNS" | 100 |
| "Hycar 1053" | 40 |
| "Paraplex G25" | 25 |
| "Paraplex G40" | 25 |
| Rutile titanium dioxide "R510" | 100 |
| "Mark M"+"Mark PL" (2:1) | 3 |
| "Thermolite 31" | 0.5 |
| | 293.5 |

The process of this invention therefore manufactures a shoe by bonding a vinyl-coated upper to a rubber sole. The upper is formed by applying to a suitable substrate, based on cloth, an adhesive consisting of either (a) a dispersion of about 35% in toluene of the calender coating described below, (b) a vinyl-pyridine/resorcinolformaldehyde latex, or (c) a 5% solution of polymethylene polyphenylisocyanate in a mixture of 50/50 toluene/methylethyl ketone.

The calender coating is applied by calendering on the adhesive-coated substrate. It consists of a curable composition of a sulfur-curable rubber, the rubber consisting of a copolymer of a major proportion of butadiene and a minor proportion of styrene or acrylonitrile, and there being present about 70 to 90 phr. of conventional reinforcing fillers as well conventional additives consisting of sulfur powder, pigments curing accelerators, and antioxidants. The calender coating is then topcoated with a composition consisting essentially of (a) about 30 to 40% of a copolymer of about 85 to 91% of vinyl chloride and, correspondingly, about 15 to 9% of vinyl acetate, (b) from about 10% to about 30% of a copolymer of 75 to 60% of butadiene with correspondingly, 25 to 40% of acrylonitrile, and (c) about 20 to 40% of at least one plasticizer. The coated material was then cured, for instance for 1 hour at 280° F., the time varying with the temperature, as is well known. Curing temperatures preferred are in the range of about 265° F. to 310° F.

An upper is then cut out from the material so prepared, using a pattern or template of a standard form.

A shoe-sole biscuit is then made from a curable composition consisting essentially of (1) a sulfur-curable rubber consisting of a copolymer of about 2 parts of butadiene with about 1 part by weight of acrylonitrile (2) at least one plasticizer (3) about 70 to 90 phr. of conventional reinforcing fillers, and (4) conventional additives consisting of sulfur powder, pigments, curing, accelerators, and antioxidants. None of the plasticizers should be of the migratory type; all must be of the nonmigratory type.

The upper is wrapped around a hot last at about 300° F. The shoe-sole biscuit is placed in a shoe-sole mold. The hot last bearing the upper and the shoe-sole mold containing the sulfur-curable rubber composition are then brought together in suitable contact, the temperature of the assembly being about 300° F. Curing at this temperature requires 3 to 4 minutes. After curing, of course, the shoe is removed from the mold.

DEFINITIONS

"Adipol XX" is di-isodecyl adipate.
"Altax" is benzothiazyl disulfide.
"Antioxidant 2246" is 2,2'-methylene-bis-(4-methyl-6-tertiary butyl-phenol).
"Antioxidant 425" is 2,2' - methylene - bis-(4-ethyl-6-teritary butyl-phenol).
"Butyl Zimate" is zinc dibutyl-dithiocarbamate.
"Chemigum N6B" is a synthetic rubber that is a copolymer of 64 parts butadiene and 36 parts acrylonitrile.
"Emersol 132" is stearic acid.
"HAF Black" is a carbon black.
"HiSil 233" is ultra-fine hydrated silica.
"Hycar 1042" is understood to be a synthetic rubber that is a copolymer of about 30% acrylonitrile and about 70% butadiene. It is in slab form, is oil resistant and is polymerized at low temperatures.
"Hycar 1042–X69" is a non-staining type of Hycar 1042.
"Hycar 1053" is a synthetic rubber that is a copolymer of 25–40% acrylonitrile and 75–60% of butadiene.
"Mark M" is a barium-cadmium stabilizer of the phenate type.
"Mark PL" is a zinc-organic complex used in conjunction with "Mark M" and the like.
"Methyl Tuads" is a tetramethylthiuram disulfide.
"Monoplex S–73" is a monomeric plasticizer having a theoretical molecular weight of 420. It has a saponification number of 144, an acid number of 0.3–1.0, a specific gravity of 0.9180, a viscosity of 0.25 poises at 25° C., a refractive index of —19° F., and a refractive index. It is understood to be an ester of long chain alcohols and a dibasic acid.
"Paraplex G25" is a polymeric ester of polyethylene glycol and sebacic acid having a molecular weight of 8000.
"Paraplex G 40" is a polymeric plasticizer which is an ester of polyethylene/propylene glycol and sebacic acid and has a molecular weight of 6000.
"Paraplex G 50" is a polymeric plasticizer which is a polyester formed by the condensation of adipic acid with dipropylene glycol, having a formula weight of about 2200 and a viscosity of 3,000 cps. at 20° C.
"Plastolein 9720" is a polymeric plasticizer having a molecular weight of 850 and a solidification point of 20° F. It is a polyester made by condensing azelaic acid with a dihydric alcohol.
"Rotax" is specially purified 2-mercaptobenzothiazole.
"Santicizer 141" is diphenyl ethylhexyl phosphate.
"Santicizer 160" is butyl benzyl phthalate.
"Santicizer 409" is a true polymeric plasticizer made from a dibasic acid and a glycol.
"Shell S–1500 XFP" is a synthetic rubber consisting of a copolymer of 1 part styrene and 3 parts butadiene.
"Shell S–1502S" is a synthetic rubber consisting of a copolymer of 22.5–24.5% styrene and 77.5–75.5% butadiene.
"Thermolite 31" is a sulfur-containing organic tin stabilizer for vinyl resins and the like.
"Trimene Base" is an accelerator consisting of triethyl trimethylene triamine and stearic acid.
"Unads" is tetramethylthiuram sulfide.
"VYNS" is a copolymer of 90% by weight of vinyl chloride and 10% by weight of vinyl acetate and has an intrinsic viscosity of 0.79.
"Wingstay T" is a liquid hindered phenol that functions as a stabilizer and antioxidant.

All percentages and ratios in the instant specification and claim are on the weight basis unless otherwise stated.

What is claimed is:

1. In the manufacture of a shoe, the method of bonding a vinyl-coated upper to a rubber sole comprising
   (A) forming an upper by
      (1) applying to a suitable substrate, based on cloth, an adhesive selected from the group, consisting of (a) a dispersion of about 35% in toluene of the calender-coating defined in section (A) (2) of this claim, (b) a vinyl-pyridine/resorcinol-formaldehyde latex, and (c) a 5% solution of polymethylene polyphenylisocyanate in a mixture of 50% of toluene and 50% of methylethyl ketone,
      (2) calender-coating on the adhesive-coated substrate a curable composition of a sulfur-curable rubber, the rubber consisting of a copolymer of a major proportion of butadiene and a minor proportion of a substance selected from the group consisting of styrene and acrylonitrile and there being present about 70 to 90 phr. of conventional reinforcing fillers, there also being present conventional additives consisting of sulfur powder, pigments, curing accelerators, and antioxidants,
      (3) topcoating the calendered coating with a composition consisting essentially of
         (a) about 30 to 40% of a copolymer of about 85 to 91% of vinyl chloride and, correspondingly, about 15 to 9% of vinyl acetate,
         (b) from about 10% to about 30% of a rubber consisting of a copolymer of 75 to 60% of butadiene with, correspondingly, 25 40% of acrylonitrile, and
         (c) about 20 to 40% of at least one plasticizer,
      (4) curing the coated material
      (5) cutting out an upper from the thus coated and cured substrate according to a conventional template for uppers,
   (B) making a shoe-sole biscuit of a sulfur-curable rubber composition consisting essentially of
      (1) a sulfur-curable rubber consisting of a copolymer of about 2 parts of butadiene with about 1 part by weight of acrylonitrile
      (2) at least one plasticizer
      (3) about 70 to 90 phr. of conventional reinforcing fillers, and
      (4) conventional additives consisting of sulfur powder, pigments, curing accelerators, and antioxidants
   (C) the upper and the shoe-sole materials being free from migratory plasticizers
   (D) wrapping the upper around a hot last at about 300° F.
   (E) placing said shoe-sole biscuit of a sulfur-curable rubber composition in a shoe-sole mold
   (F) bringing together in suitable contact for about 3–4 minutes the hot last bearing the upper and the shoe-sole mold containing the sulfur-curable rubber composition, the temperature of the assembly being about 300° F.
   (G) removing the shoe from the last and mold.

No references cited.

ROBERT F. WHITE, *Primary Examiner.*

ROY B. MOFFITT, *Examiner.*

T. J. CARVIS, *Assistant Examiner.*